Oct. 2, 1962  H. B. HUNTRESS ETAL  3,056,262
BRAKE APPARATUS
Filed Nov. 28, 1960  4 Sheets-Sheet 1

Inventors
Howard B. Huntress
Thomas S. Taylor
By Wallace, Kinzer and Dorn
Attorneys

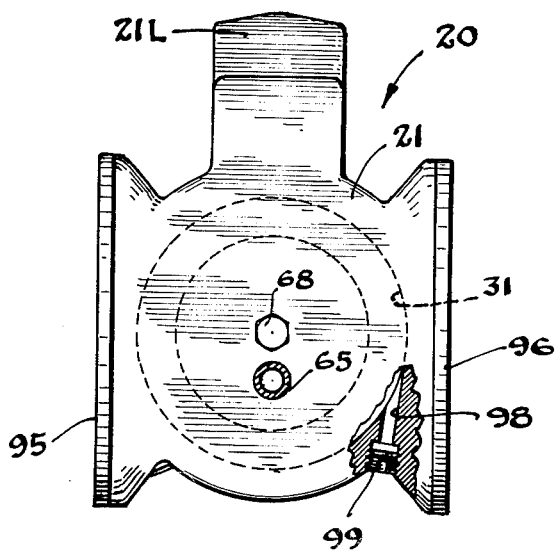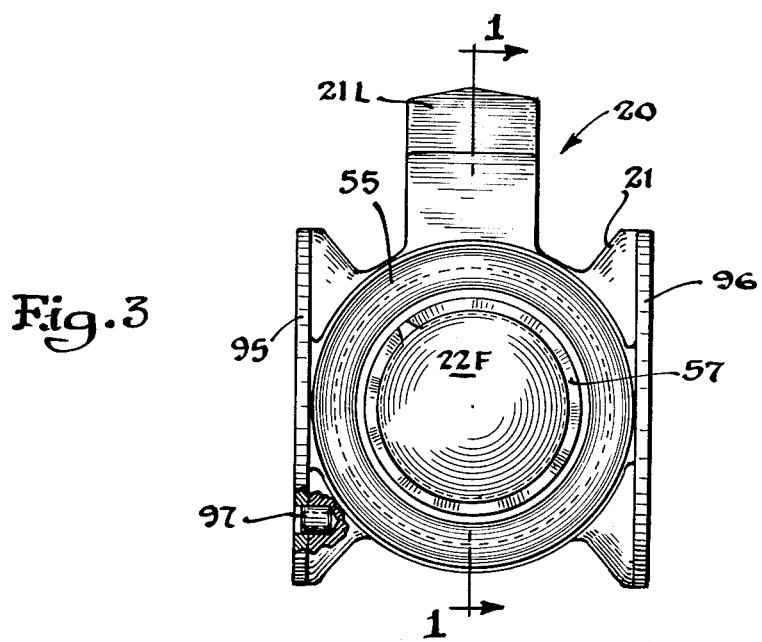

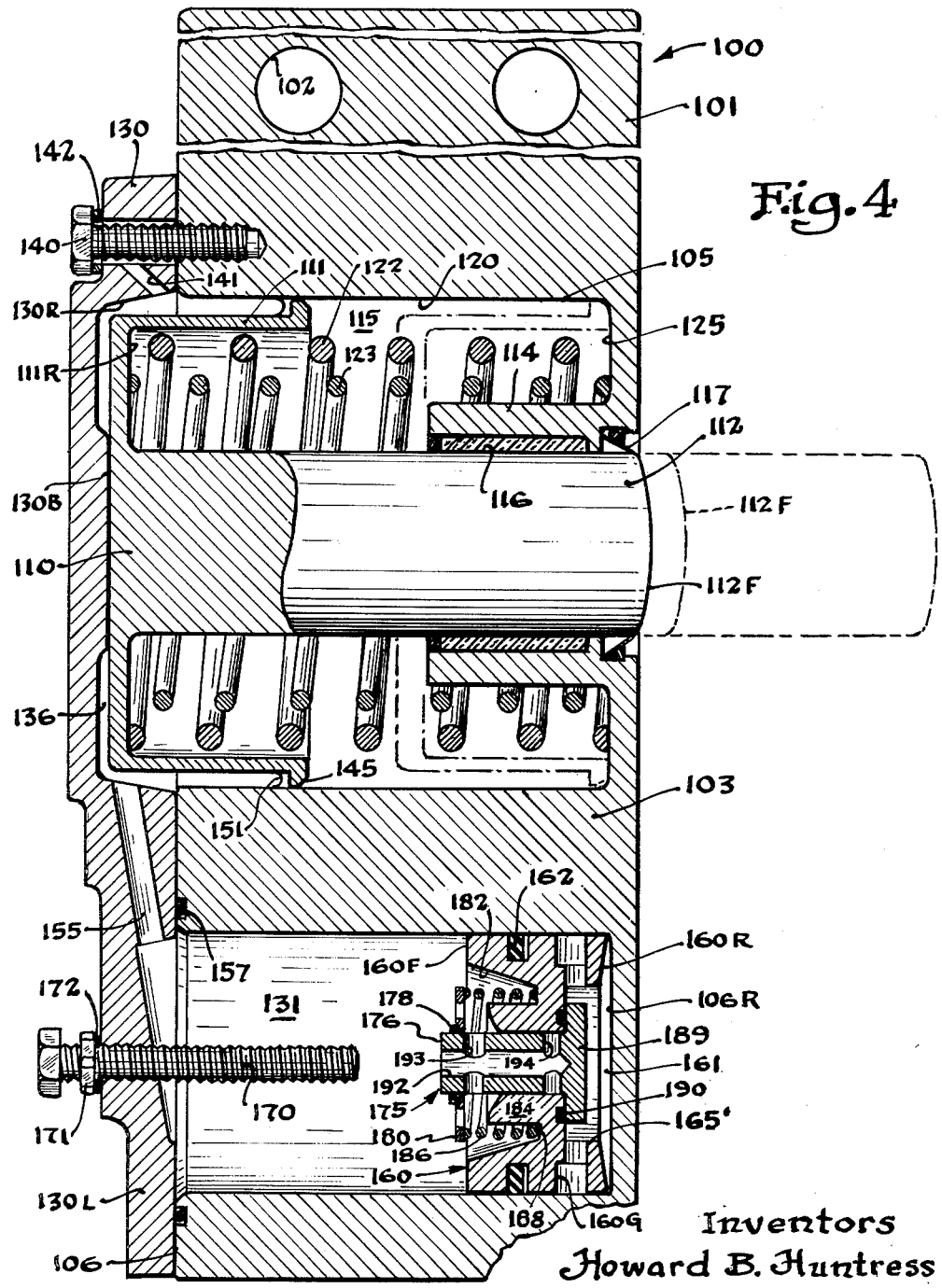

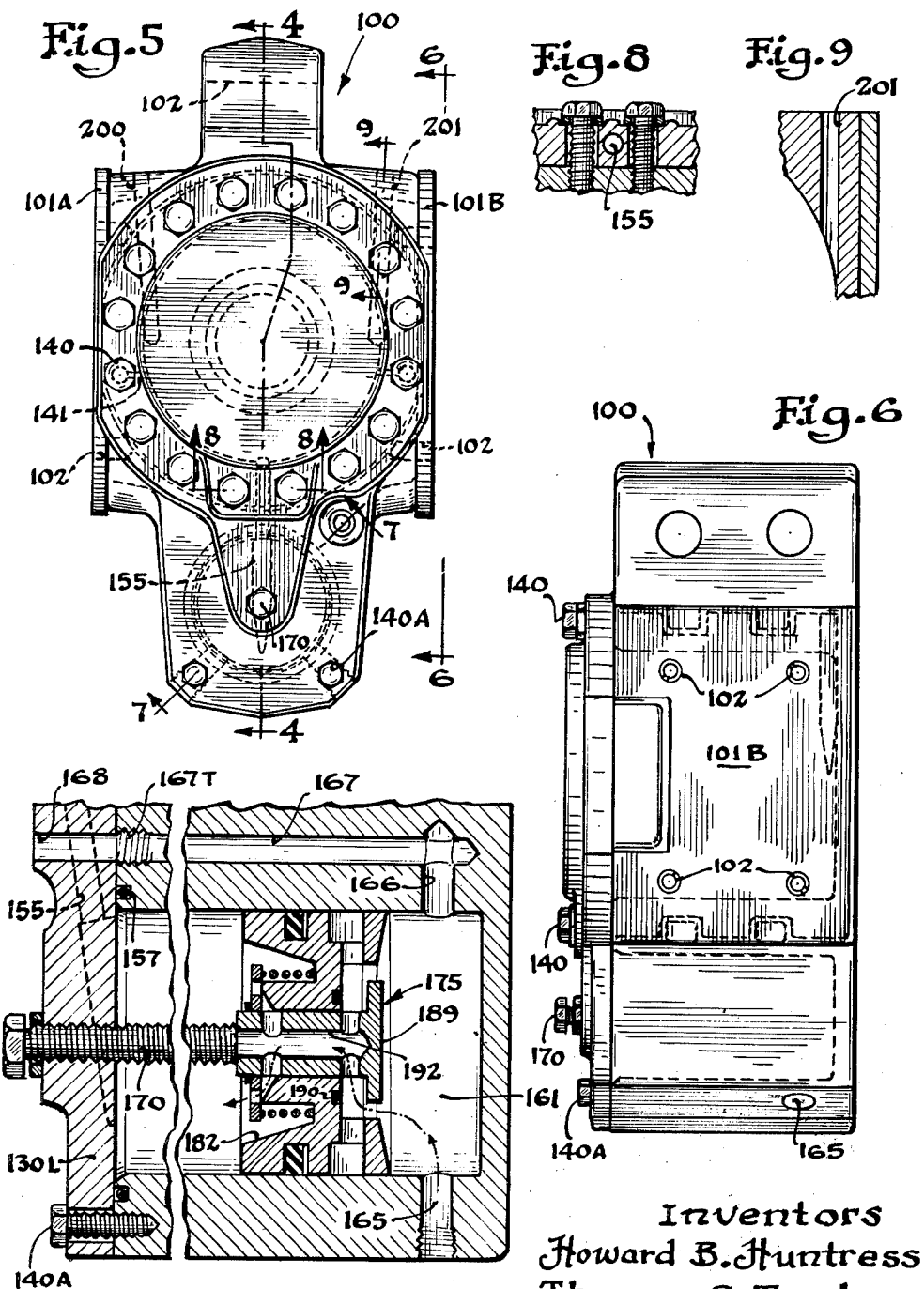

United States Patent Office 3,056,262
Patented Oct. 2, 1962

3,056,262
BRAKE APPARATUS
Howard B. Huntress and Thomas S. Taylor, Suffern, N.Y., assignors to American Brake Shoe Company, New York, N.Y., a corporation of Delaware
Filed Nov. 28, 1960, Ser. No. 72,119
2 Claims. (Cl. 60—54.5)

This invention relates to brake apparatus and in particular to a hydraulic brake adapted to apply a braking force to the brake head of a railroad car.

Under the present invention, a railroad brake shoe is to be engaged in a braking relation with the tread of the car wheel by applying a hydraulically generated force thereto. It is advantageous to be able to return the brake shoe, after each braking action, to a fixed start position spaced a predetermined distance from the wheel tread which will remain substantially constant, say one-quarter of an inch away from the tread of the associated car wheel. However, the brake shoe necessarily undergoes wear during the course of repeated braking operations and consequent slack, that is, a gradual increasing in the aforesaid spacing, will occur unless this slack is compensated. In accordance with the present invention, slack adjustment, that is slack take-up due to brake shoe wear, is accomplished in a unique and reliable manner by driving a main brake applying piston with fluid placed under pressure by an independently operable slack adjusting piston, actuated in turn from a source of fluid under pressure through a stroke of predetermined extent to a fixed limit position that should produce brake engagement under normal conditions. If brake engagement does not occur within this predetermined stroke of the slack adjuster piston, then valve means associated therewith are opened to enable make-up fluid under pressure from the source to directly drive the main piston until the brake is applied. The volume of make-up fluid will represent the displacement required to compensate for brake wear. The arrangement for accomplishing this is the primary object of the present invention, and a related object of the present invention is to assure that when the brake is released the make-up fluid will be trapped behind the main piston so that the main piston, upon return movement thereof, will ultimately be disposed in a start or brake released position differing from its previous brake released position by the displacement of make-up fluid that was required for the slack adjustment.

Other objects of the present invention are to enable the pistons to be promptly responsive to conditions dictating their movement; to assure proper sealing so that there will be no appreciable leakage of fluid and consequent unreliable performance; to enable slack to be easily paid out or extended rather than shortened or made up, when desired; to enable the length of the predetermined maximum stroke of the slack adjuster piston to be varied to account for variant operating conditions; and other and further objects of the present invention will be apparent from the following description and claims and are illustrated in the accompanying drawings which, by way of illustration, show preferred embodiments of the present invention and the principles thereof and what is now considered to be the best mode contemplated for applying these principles. Other embodiments of the invention embodying the same or equivalent principles may be used and structural changes may be made as desired by those skilled in the art without departing from the present invention and the purview of the apended claims.

In the drawings:

FIGS. 2 and 3 are elevations at opposite sides of one form of hydraulic brake apparatus constructed in accordance with the present invention, FIG. 2 being partly in section;

FIG. 4 is a sectional view of hydraulic brake apparatus constructed in accordance with the present invention and taken substantially on the line 4—4 of FIG. 5;

FIG. 5 is an elevational view of another form of hydraulic brake apparatus constructed in accordance with the present invention;

FIG. 6 is an elevation taken on the line 6—6 of FIG. 5;

FIG. 7 is a sectional view taken substantially on the line 7—7 of FIG. 5 and showing the slack adjuster piston in its forward limit position; and FIGS. 8 and 9 are fragmentary detail views taken substantially on the lines 8—8 and 9—9 of FIG. 5.

The brake apparatus of the present invention is specifically adapted to be utilized for exerting brake applying pressure on the brake heads of railroad brake shoes. Typical overall connections are illustrated in our copending application Serial No. 850,697 filed November 3, 1959. Thus, in the overall connections, hydraulic fluid in a master cylinder is to be supplied to individual wheel cylinders that are positioned adjacent the car wheels, and the brake applying piston in the wheel cylinder is so connected to the brake head which supports the brake shoe as to apply a force thereto that urges the brake shoe into contact with the wheel tread at the time the brakes are to be operated. As disclosed in the aforesaid application, the brake force applying piston in the hydraulic wheel cylinder is connected directly to the brake head. The present invention is specifically concerned with the construction of wheel cylinders enabling a braking force to be applied to a railroad brake shoe or the like, and in particular to a novel arrangement for producing slack adjustment in brake apparatus. Thus, due to the wear of the brake shoes, it is necessary to compensate for this by repeatedly adjusting the start or brake released position of the brake applying piston. This is accomplished under the present invention by a unique cooperation between the slack adjuster and brake applying pistons whereby variant conditions can be accounted for by manual adjustments in the apparatus. Additionally, make-up fluid for normal slack adjustment is valved without having a slack adjuster piston sliding in metal-to-metal contact across a port means in its cylinder to accomplish valving, and an effective sealing system is afforded that assures against leakage.

Figure 1:
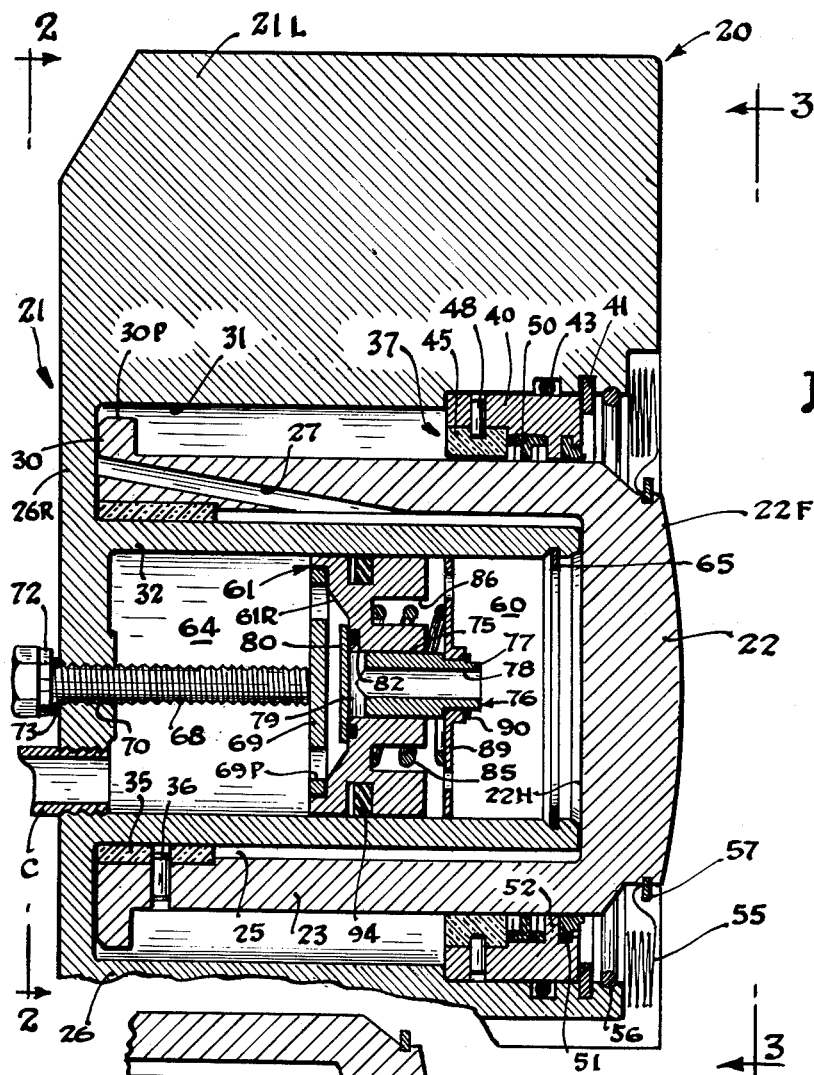
FIG. 1 is a sectional view of hydraulic brake apparatus constructed in accordance with the present invention, and taken on the line 1—1 of FIG. 3.

Thus referring to FIG. 1, hydraulic brake apparatus 20 is constructed to be of a size that can be conveniently located adjacent the side frame of a railroad car truck. To this end, the apparatus 20 includes a housing member 21 in the form of a casting 21, FIGS. 1, 2 and 3, formed with a projecting lug 21L that is adapted to be bolted to the aforesaid side frame in a rigid relationship. The disposition of the housing 21 when so mounted will be such that the forward face 22F of a brake applying piston 22 will be in position to exert a brake applying force on the brake head (not shown) when the piston is moved in a forward or brake applying direction, left to right as viewed in FIG. 1. Piston 22 is reciprocal in a cylinder as will now be explained.

The piston 22 is of hollow form as will be evident in FIG. 1 so as to have a cylindrical sleeve or skirt portion 23 extending rearwardly into a chamber 25 afforded by a first or outer cylinder 26 having an open forward end and a closed rear wall 26R formed in the housing 21. Chamber 25 is located behind the head 22H of the piston 22 in communication therewith and is arranged as will be explained to communicate with a flange at the rearwardmost part of the piston 22. Return springs (not shown) are located externally of the housing 21 and are effective when hydraulic pressure is released, to move piston 22 in a return direction to the start position such as that illustrated in FIG. 1. The start position will creep forward due to repeated automatic slack adjustments as will be apparent from the description to follow. Thus, when pressure originating in the master cylinder, to which reference will be hereinafter made, ceases, the aforesaid return springs take over to move the brake applying piston rearwardly from an advanced braking position to its start position.

An angled bore 27 is formed in the skirt portion 23 of the piston 22 so as to open at one end into chamber 25. The passage 27 at the opposite end opens at the rear face of a flange 30 formed at the back or the innermost portion of the piston skirt 23. It will be noted that the outer peripheral edge 30P of the flange 30 is spaced radially inwardly of the outermost wall 31 of the cylinder 26. The inner wall of this cylinder is defined by an annular sleeve 32 which is cast integral with the housing 21. Thus, sleeve 32 defines a second or inner cylinder coaxial with the first cylinder, and the interior of the second cylinder affords a second chamber to which reference will hereinafter be made. Thus, it will be seen that the piston 22 is so configured and disposed in chamber 25 that the circumferential inner and outer sides of the skirt 23 are free of the walls of the related cylinder for substantial areas. In this connection it is to be pointed out that the piston 22 is in part guided in its reciprocal motion in its cylnder by a bushing 35 carried at the rear end of the piston skirt 23. The bushing 35 is retained in position by roll pins 36 disposed in communicating openings formed in the bushing 35 and skirt portion 23. Thus, the guide 35 serves to space the inner wall of piston 22 from the adjacent outer wall of the sleeve 32 which cooperates in defining the cylinder chamber 25.

Piston 22 is also guided and supported by bushing structure 37 disposed in the outer wall of cylinder 26 adjacent the forward end of the cylinder 26 in which the piston 22 reciprocates. Thus, a relatively large seal retainer ring 40 is fitted into a complementally shaped recess adjacent the forward end of cylinder 26, and is retained in place by a snap ring 41 that bears against the forwardmost face of the retainer ring 40, the snap ring 41 being expanded in a corresponding annular shaped recess in housing 21. The interface between the opposed aligned peripheries of the retainer ring 40 and the adjacent wall of the housing 21 is sealed by a static O-ring seal 43.

A guide bushing 45, engageable with the outer cylindrical surface of piston 22, is secured to the retainer ring 40 by roll pins 48, and it will be recognized that total displacement of piston 22 in cylinder 26 is prevented by the flange 30 on piston 22 engaging the rear of the fixed bushing structure 37.

In order to assure against leakage, a dynamic seal ring 50, of general T-shape in cross-section as will be evident in FIG. 1, is mounted in an L-shaped recess in the radial inner surface of the retainer ring 40. The enlarged head of the seal 50 is outermost, and the narrow leg portion thereof extends radially inwardly to bear against the outer surface of the skirt portion of the piston 22. Further, a scraper ring 51 is fixed in a recess at the outer or forwardmost end of the retainer ring 40, and the dimensions are such that the radial inner surface of the scraper 51 is effective to maintain clean the outer surface of the piston skirt 23 which, it is to be noted, is chromium plated. A solid annular element 52 of the retainer ring 40 separates the recesses in which the seal 50 and scraper 51 are disposed.

The cylinder chamber in which piston 22 moves is sealed against the ingress of dust and dirt by a dust boot 55. The inner end of the dust boot 55 is secured to the outer open end of cylinder 26 by a snap ring 56, and the outer end of the dust boot is secured to the forward end of the piston by a snap ring 57.

It will be recognized that the rear face of the piston flange 30, inward of the diameter of the seal 50, in cooperation with the rear face at the back of the piston head 22H affords a quite large effective area against which fluid under pressure can act to move the piston 22 in a forward direction.

Chamber 25 is in communication with a chamber 60 at the forward side of a slack adjuster piston 61 that is disposed to slide reciprocally in the cylinder encompassed by cylinder wall 32. The slack adjuster piston 61 is normally disposed at an intermediate position in its cylinder, and resultantly there is a chamber 64 at the rear or left-hand side of the slack adjuster piston 61 in the retracted or start position thereof as viewed in FIG. 1. The chamber thus afforded at the rear of the slack adjuster piston is in communication with the master cylinder (not shown) by way of a conduit C threadedly mounted in an opening at the back of cylinder 32. Thus, when the brake is to be engaged, fluid under pressure from the master cylinder as a source is directed through conduit C and enters chamber 64 causing forward movement of the slack adjuster piston 61. Forward movement of the slack adjuster piston to the right as viewed in FIG. 1 accordingly exerts pressure on the fluid confined in chamber 60—25, thereby causing forward movement of the brake piston. There is prompt response by the brake applying piston, since the fluid thus under pressure also acts between the piston rear flange and the rear wall of cylinder 26 in which the brake applying piston moves, this occurring by way of port 27. It should be mentioned that the effective surfaces of the two pistons under consideration is such that the brake piston 22 undergoes approximately one increment of movement for each three increments of movement of the slack adjuster piston. Advantageously in actual operation, the parts are so adjusted initially that the retracted or idle position of piston 22 spaces the wear face of the brake shoe approximately one-fourth of an inch from the tread of the railroad car wheel. Therefore, to engage the brake, the slack adjuster piston is to undergo movement of approximately three-fourths of an inch, and of course both pistons move forward simultaneously.

In any event, maximum forward movement of the slack adjuster piston is limited by a stop 65 in the slack adjuster cylinder in the form of a ring which is affixed to the inner surface of the cylinder wall 32 adjacent the forward end thereof immediately behind the rear face of the brake applying piston head 22H. The precise manner in which the stop limits forward movement of the slack adjuster piston will be described hereinafter. In order that variable conditions can be accounted for insofar as the optimum extent of movement of the brake piston is concerned, an adjustable stop pin 68 is located in chamber 64 to be engaged by the slack adjuster piston during return movement thereof. In other words, the start position of the slack adjuster piston can be varied by appropriately adjusting pin 68 and such adjustments will determine, let us say, whether the brake applying piston is to have a maximum stroke of one-quarter of an inch, or one-half of an inch, and so on. Moreover, return movement of the brake piston 22 under the influence of the return means associated therewith necessarily exerts pressure on the fluid confined in chamber 25—60, and because of the areas mentioned above, this results in a quick return of the slack adjuster piston from its forward actuated position, where the brake shoe was engaged, to its return or idle position where the brake is fully released. The idle or rest position of the slack adjuster piston will be limited by a ported stop plate 69 (having ports 69P) which is secured to the rear side of the slack adjuster piston 61. The stop plate 69 has a solid medial surface adapted to bear against the inner end of the stop pin 68 which is in the form of a screw threadedly mounted in an aperture 70 in the rear wall of the housing 21. The set position of the stop 68 is held by a seal nut 72, and a seal ring 73 is interposed between nut 72 and the threaded aperture 70. It will be recognized, therefore, that the stops 65 and 68 represent a variable means in the slack adjuster piston cylinder for establishing a predetermined maximum stroke of the slack adjuster piston.

Inasmuch as the brake shoe associated with the apparatus 20 will necessarily undergo wear during use, causing a slackened condition that would not normally be taken up to produce brake engagement when piston 61 reaches its forward limit position defined by the stop 65, means are afforded to allow for a surge of make-up fluid from chamber 64 into chamber 60 when the slack adjuster piston 61 tends to be moved beyond the limit position defined by the stop ring 65. In accordance with the present invention, valve and porting means are carried by the slack adjuster piston 61 and are effective when the slack adjuster piston reaches its forward limit position to permit passage of fluid under pressure directly from the source (the master cylinder) into chamber 60—25 that is interposed between the two pistons. Such results in independent forward movement of the brake applying pison until the slack is taken up and the brake engaged. The make-up fluid is to be subsequently trapped to thereby displace the slack.

To this end, the rear face of piston 61 is formed with a generally cone-shaped recess 61R at the center portion therof immediately forwardly of the forward face of stop plate 69. A passage 75 is formed through the central portion of the piston 61, and opens respectively into chambers 60 and 64. A valve and port means 76 is slidably disposed in opening 75. Thus, valve 76 includes a tubular stem 77 having a central port 78 therethrough such that port 78 opens at one end into chamber 60, and at the other end communicates with a right-angled passage 79 in the valve stem. The valve 76 includes a valve head 80, and the inner or forward side of the valve head 80 normally seats tightly against a static seal ring 82 to prevent communication between chambers 64 and 60.

Thus, the valve means 76 is normally effective to prevent the passage of fluid from chamber 64 to 60, and in fact fluid under pressure in chamber 64 acts against the exposed rear face of the valve head 80 to assist in holding the valve closed. However, the valve is normally held closed by a positive acting force exerted by a relatively strong coil spring 85 having an inner end seated in an annular recess 86 at the forward side of piston 61. The opposite end of the spring 85 bears forcefully against a valve actuating plate 89 which is retained in place at the forward end of the valve stem 77 by a retainer ring 90 secured to the valve stem. The valve actuating plate 89 is apertured as will be noted in FIG. 1, and the spring 85 is normally effective to exert a strong forwardly directed holding force on the valve stem to hold the valve head 80 in a tight sealing relationship against the static seal 82.

Figure 1A:
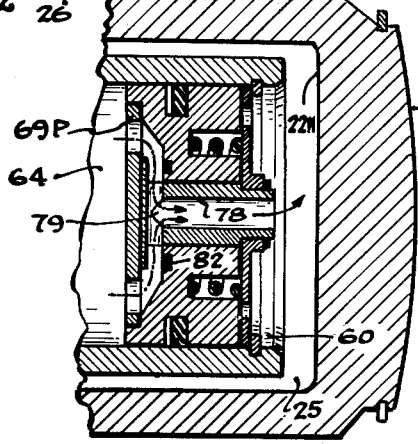
FIG. 1A is a fragmentary sectional view illustrating the slack adjuster piston of FIG. 1 in its forward limit position.

It will be noted that the actuating plate 89 has an outer diameter corresponding to the inner diameter of the cylinder 32 and hence is adapted to bear against the stop ring 65. Thus, when fluid under pressure in chamber 64 is effective to forcefully move the piston 61 to a point where further pressure differential, due to lack of brake engagement if such exists, causes relative movement between the piston 61 and the actuating plate 89 bearing against the stop 65, spring 85 is compressed causing the valve means 76 to move to the left as viewed in FIG. 1 to the position shown in FIG. 1A. This results in passage 79 being disposed free of the otherwise confining passage 75 in piston 61, that is, the valve head 80 is moved away from the static seal 82. Accordingly, fluid under pressure in chamber 64 is free to surge through the apertures as 69P in the stop ring 69, through the transverse passage 79, down the elongated valve port 78 and into chamber 60. This make-up fluid under pressure thus entering chamber 60 is effective to further advance piston 22 independently of piston 61 which has been stopped, until brake engagement is established. Thereafter, upon cessation of the pressure established by the master cylinder, the return means acting on the brake piston take over placing the fluid in chamber 25—60 under pressure in a direction opposite that which was used for brake engagement. In this connection, it will be recalled that the slack adjuster piston 61 moves relatively more rapid than the brake piston 22 in either direction. Hence, the instant that the brake piston 22 is moved in a return direction from its advanced position illustrated in FIG. 1A, the slack adjuster piston 61 is moved rapidly to the left away from the stop 65. Spring 85 is no longer under compression and therefore causes the valve means 76 to snap shut to its closed position thereby trapping the make-up fluid in the chamber immediately behind the head 22H of piston 22. Both pistons 22 and 61 continue return movement until the stop plate 69 strikes the adjustable stop 68, and because of the trapped volume of make-up fluid, piston 22 will ultimately come to a stop position that is more forward than the position from which it started prior to the passage of the make-up fluid from chamber 64 to chamber 60. Accordingly, the necessary slack adjustment has been attained.

In normal operation, the valve does not pass oil but forces oil ahead of it. If the slack adjuster piston does not engage its stop, this characterizes normal brake engagement, and during return movement of piston 22, oil is under pressure in the chamber 60 that is interposed between the pistons for a normal return stroke of about ¼". During the slack adjustment, a passage on the inside of the slack adjuster mechanism is opened, and make-up fluid will flow until the brake is engaged.

Referring to FIGS. 2 and 3, wear plates 95 and 96 are advantageously secured to opposite surfaces of the housing 21 by roll pins as 97. These plates will engage the brake head structure when the apparatus 20 is in operative position on the railroad car. A port 98 is formed in the housing 21 to be in communication with the chamber associated with piston 22. This port is normally closed by a pipe plug 99 which, when removed, enables the hydraulic fluid to be bled.

Even assuming that the slack adjuster piston is in the position shown in FIG. 1, and that the brake piston 22 is more forward of the position shown in FIG. 1 (say that corresponding to FIG. 1A), piston 22 can be returned or moved back on the purposeful application thereto of the necessary amount of external force. This develops pressure on the right-hand side of the slack adjuster piston in chamber 60, FIG. 1, and it is assumed that this pressure is great enough to overcome the valve-holding force of spring 85. Accordingly, the valve mechanism 76 slides to the left as viewed in FIG. 1, and fluid in chamber 60 surges through passages 78 and 79 and through the apertures 69P in plate 78 to spill over into chamber 64. It is important in this connection, and also in connection with the dynamic operation of valve 61 described above, to note that the periphery of valve body 61, which slides in contact with wall 32, is provided with a dynamic seal ring 94 which further assures against leakage.

In the event it is determined that the operation stroke should be lengthened beyond ¼", which was the example given above, then screw stop 68 can be moved back or withdrawn to the left as viewed in FIG. 1.

The hydraulic apparatus illustrated in FIGS. 4 to 9 represents another embodiment of the present invention wherein it is possible to provide for a longer stroke of the brake piston by off-setting the cylinders for the brake-applying piston and the slack adjuster piston. This arangement also enables the brake piston return springs to be located internally of the housing structure, rather than externally as mentioned above, and these advantageous results are in part due to the forward strokes of the two pistons occurring in opposite directions.

Thus, as shown in FIG. 4, the hydraulic brake apparatus illustrated at 100 includes a relatively large main housing 101 formed with bolt-receiving openings as 102 enabling the associated structure to be conveniently secured to the side frame of a railroad car truck. As in the foregoing embodiment, wear plates 101A and 101B, FIG. 5, are secured to opposite surfaces of the housing 100 by roll pins as 102, FIG. 5. The housing 101 is so configured as to have an internal cylinder wall 103 which defines a first cylinder 105 and a second cylinder 106. A brake applying piston 110 is disposed for reciprocal movement in cylinder 105 between a released or retracted position as illustrated in bold lines in FIG. 4, and a forward brake force applying position illustrated by dotted lines in FIG. 4. To this end, the piston 110 includes a cup-shaped operating head 111, and a stem or shaft portion 112 extends forwardly therefrom. The forward face 112F of the piston shaft is adapted to exert a direct force on the head of the brake shoe with which the apparatus 100 is associated. In this connection it will be noted that the housing 101 is so formed as to have a guide sleeve 114 extended into a chamber 115 which is the part of the cylinder 105 on the forward side of the piston head 111. The guide sleeve 114 is recessed on the inside diameter thereof, and a support bushing 116 is secured therein to be in direct contact with the external surface of the piston shaft 112 so as to accurately guide and support the same in the reciprocal movement thereof. The forwardmost end of the support sleeve 114 is recessed, and a scraper ring assembly 117 is disposed therein to maintain clean the chromium-plated surface of the piston shaft 112.

The piston head 111, as will be noted in FIG. 4, is provided with a relatively large recess 111R at the forward side thereof. A like recess is afforded between the outer wall 120 of the cylinder 105 and the support sleeve 114. This arrangement of parts enables a pair of return coil springs 122 and 123 to be disposed concentrically about the piston shaft 112 with the ends of the springs bearing respectively against the forward end wall 125 of the cylinder 105 and the forward face of the piston head as will be evident in FIG. 4. Thus, the springs 122 and 123 react against the cylinder wall 125 and are effective to exert a return action against the piston 110 tending to dispose this piston in the position shown in FIG. 4.

The chamber 115 is of uniform diameter throughout and is open at the left hand end thereof as viewed in FIG. 4. The open end of chamber 115 is tightly sealed by a relatively large seal cap 130 which, it should be noted, also seals the open end of the chamber 131 which is associated with the lower cylinder 106. Thus, the portion of the seal cap 130 which is co-extensive with the upper cylinder 105 is recessed at 130R to enable the head of the piston 110 to extend thereinto. The inner face of the cap 130 which which is opposite the medial portion of the piston head 110 is formed with a rise 130B adapted to engage the medial portion of the piston head 110 in the rearwardmost retracted or brake releasing position thereof. The resultant relationship for any position of the piston 110 affords a chamber 136 at the rear face of the piston head, and this chamber is adapted to contain fluid which is to be placed under pressure incidental to causing left to right hand movement of the piston 110 in a brake applying direction as viewed in FIG. 4.

The seal cap 130 is held in place by a plurality of securing bolts 140 disposed in clearance openings in the flanged portion of cap 130 and are secured in tapped openings appropriately located in housing 101. The particular retaining bolt 140 shown in FIG. 4 also serves as a bleed for chamber 136. Thus, a passage 141 is formed in the flange of cap 130 so as to communicate with the threaded opening therein in which the bolt 140 is disposed. By removing this bolt, chamber 136 can be bled, and under normal conditions leakage is prevented by a seal 142 disposed between the head of the bolt 140 and the corresponding surface of the cap 130.

The forward end of the piston skirt 111 is enlarged to afford an annular flange 145 which serves to strengthen the piston and which acts as a stop in the event it should engage the cylinder end wall 25 during the forward stroke of piston 110. A long stroke diaphragm 151, which normally is in a folded sate as viewed in FIG. 4, has an outer marginal or flange portion interposed between the opposed surfaces of the cap 130 and the rear wall of cylinder 105 as shown in FIG. 4. The medial portion of this diaphragm overlies the rear face of the piston head 110 and is secured thereto by a suitable cement. In this manner, chambers 115 and 136 are effectively sealed off from each other.

The chamber 136 at the rear side of the brake applying piston communicates with chamber 131 of the lower cylinder which also confines fluid to be placed under pressure. The two chambers are in communication by way of a passage 155 formed in the seal cap 130, and as shown in FIG. 7 bolts 140A as described above are extended through the lower end 130L, FIG. 7 of the seal cap and into the wall of the lower cylinder 106. The opposing areas are sealed by an O-ring 157.

Fluid confined in chambers 131 and 136 is to be placed under pressure, to cause forward movement to the right of piston 112, by a forward movement to the left, FIG. 4 of a slack adjuster piston 160. Thus, as in the foregoing embodiment, a fluid-containing chamber is interposed between the brake piston and the slack adjuster piston to condition the brake piston for forward movement upon forward movement of the slack adjuster piston. As in the foregoing embodiment, the effective area of the forward face of the slack adjuster piston is less than the effective area of the rear face of the brake applying piston 110. The relationship is preferably one wherein piston 160 moves through three space increments in causing simultaneous forward movement of piston 112 one space increment.

The normal or retracted position of piston 160 is shown in FIG. 4, and it will be noted that the rear face of piston 160 is recessed inward at 160R so that in the retracted position the slack adjuster piston 160 is disposed against the rear wall 106R of cylinder 106. However, the cavity or recess 160R at the back of the slack adjuster piston accounts for a chamber 161 into which fluid under pressure from the master cylinder is to be admitted, and when such occurs the slack adjuster piston is moved in a forward direction to the left accompanied by simultaneous forward movement of the brake piston 112 to the right as viewed in FIG. 4. A dynamic seal 162 is mounted in an annular recess in the main body of the slack adjuster piston 160 so as to maintain chambers 131 and 161 sealed one from another.

Referring to FIG. 7, fluid under pressure from the master cylinder (not shown) is admitted into chamber 161 through a port 165 which, in the retracted position of the slack adjusted piston, communicates with an annular groove 160G, FIG. 4, at the rear of the slack adjuster piston. Groove 160G in turn opens into a relatively large passage 165' formed in the back of the slack adjuster piston inward of the recess 160R. An outlet passage 166, FIG. 7, is formed in the wall of cylinder 106, and this port communicates with groove 160G in the slack adjuster piston in the retracted position of the slack adjuster piston. Port 166 also communicates with a transverse passage 167, FIG' 7, which extends through cylinder wall 103 to communicate with an opening 168 in the seal cap 130, and opening 168 is adapted to receive a conduit (not shown) having a threaded end secured in the threaded end 167T of passage 167. This conduit will extend to the adjacent apparatus for the adjacent brake to enable fluid under pressure from the master cylinder to be passed into the chamber as 161 such adjacent apparatus of like construction.

The course of forward movement of the slack adjuster piston 160 is limited by a stop in the form of an adjustable screw 170, FIG. 4, which is threadedly mounted in the seal cap 130 so as to be centrally disposed in chamber 131 at the forward side of the slack adjuster piston. Thus, by turning the screw 170 in or out, the limit for forward movement of the slack adjuster piston is accordingly determined as will be explained. The adjusted position of the screw 170 is held by a lock nut 171, and a seal 172 is interposed between the lock nut and the adjacent surface of the seal cap 130.

As in the foregoing embodiment, the slack adjuster piston 160 in this instance carries a valve and associated port means which, when in open position, communicate chamber 161 at the back of the slack adjuster piston with the chamber system at the front of the slack adjuster piston which is interposed between the brake applying piston and the slack adjuster piston. This valve is normally closed to prevent such communication. Thus, and referring to FIGS. 4 and 7, valve means 175 are afforded of such nature as to include a valve stem 176 arranged for sliding movement in a central opening in the slack adjuster piston. The valve stem 176 is aligned with the stop 170, and as shown in FIG. 4 the forward or leading end of the valve stem 176 projects beyond the forward face 160F of the slack adjuster piston 160.

The projected end of the valve stem is provided with a snap ring 178 which serves as an abutment for a ported disc 180 which is arranged concentrically about the projected end of the valve stem. The body of the slack adjuster piston 160 is formed with a cone-shaped recess 182 at the forward side thereof, and this recess is in part defined by a forwardly projecting boss 184 formed on the slack adjuster piston. A coil spring 186 is disposed concentrically about the boss 184 as a guide and is normally in an expanded state between the disc 180 and the surface 188 at the bottom of the recess 182 in the slack adjuster piston. Thus, spring 186 is effective to urge the valve 175 to the left as viewed in FIG. 4 bringing the valve head 189 into tight sealing relationship against a static seal 190 which surrounds the rear of the opening in the piston body 160 in which the valve stem 176 is disposed.

The valve stem is formed with an elongated port or passage 192 which opens at the forward end of the valve stem and which terminates at the opposite end at the underside of the valve head 189. A transverse passage or port 193 at the forward end of the valve stem, FIG. 4, is normally free of boss 184 so as to be in communication with chamber 131, whereas a transverse passage 194 at the rear of the valve stem directly behind the valve head is in a covered position within the opening in the piston body 160 in which the valve stem is slidably mounted.

As mentioned above, initial movement of the slack adjuster piston from the return limit position illustrated in FIG. 4, where it bears against the rear wall of its cylinder, is accompanied by forward movement of the brake applying piston against the return action of springs 122 and 123 which undergo compression during this stage of operation. This movement of course occurs when fluid under pressure is directed from the source into chamber 161, and fluid is placed under pressure in chambers 131 and 136. The springs 122 and 123, as will be appreciated, will account for return action of both pistons upon cessation of flow of fluid under pressure from the master cylinder into chamber 161. Thus, forward movement of both pistons occurs simultaneously until the brake shoe is engaged. In the event that piston 110 does not force the brake shoe into contact with the wheel at the time the slack adjuster piston has moved to a point where the stop 170 is effective to cause compression of the valve holding spring 186, then a slight increase in pressure in chamber 161 will force the slack adjuster piston to its ultimate position with valve 175 in the full open condition illustrated in FIG. 7. As a consequence, the valve head 189 is moved off the seal 190, and further flow of fluid from the master cylinder has free ingress to the passages 194 and 193, in the bored stem of valve 175, noting that the passage 193 still communicates with chamber 131 in the full open position of valve 175 as shown in FIG. 7. Accordingly, make-up fluid flows from chamber 161 into chamber 131 causing independent forward movement of the brake applying piston until the brake is engaged with the wheel. Thereafter, upon release of the master cylinder pressure, the return springs 122 and 123 take over causing fluid to be placed under pressure in a return direction in chamber 131. Accordingly, there is a quick movement of the slack adjuster piston 160 in a return direction, and valve 175 snaps shut trapping the make-up fluid in chamber 131. The extent of return stroke (and by the same token, the forward stroke) can be regulated for variant conditions by turning the stop 170 further in or further out as the case may be.

In the event that it is desired to pay out slack to increase the space between the wheel and the brake shoe, sufficient mechanical force is exerted on the brake shoe to move piston 110 from an extended position to a more retracted or brake releasing position, say up against the rise 130B, FIG. 4. Under this condition, valve 175 will occupy the position illustrated in FIG. 4, but as a result of the pressure established in chamber 131, which is sufficient to overcome the force of spring 186, valve 175 is opened to permit a surge of excess fluid from chamber 131 to chamber 161, and of course the master cylinder is constructed to allow for such forced slack pay-out.

In order to equalize the pressure in chamber 115, which is an air chamber, a pair of openings 200 and 201, FIG. 5, are drilled in the housing 101 to enable chamber 115 to communicate with the ambient atmosphere. These openings are provided with suitable filters. The cylinders are so related that they can be turned left or right or up-side-down to go into the four corners of the truck, and one of the two vents 200 and 201 will always be on the bottom.

It will be seen from the foregoing that under the present invention slack adjustment in hydraulic brake apparatus is accomplished without having the slack adjuster piston slide to a point where the piston itself discloses a port through which make-up fluid flows to the primary cylinder. Thus, slack adjustment is accomplished by a valve carried by the slack adjuster piston, and the maximum stroke of the slack adjuster piston can be pre-selected by appropriately lengthening or shortening the distance that the slack adjuster piston is capable of moving in a maximum stroke between the stops above described that are located in the cylinder for the slack adjuster piston. The arrangement of seals, including the dynamic and static seals associated with the slack adjuster piston, assures positive operation. Additionally, in the event that it is desired to pay out slack this can be conveniently accomplished merely by applying an external force to the brake applying piston sufficient to overcome the holding force of the spring associated with the slack adjuster piston and which is normally effective to maintain closed the slack adjuster valve.

The form of the invention illustrated in FIGS. 1 to 3, which includes the sturdy, fixed seal 50, can be operated at pressures of the order of 1000 p.s.i. and is therefore applicable for use on heavy railroad cars requiring high brake shoe loads. The form of the invention illustrated in FIGS. 4 to 9, which utilizes the diaphragm seal 151, is leak-proof since the diaphragm head is continuous, having an embraced or clamped outer flange. This arrangement is for the most part made possible by off-setting the slack adjuster piston 160 which incidentally also results in a convenient porting arrangement as shown in FIG. 4.

Hence, while we have illustrated and described preferred embodiments of the present invention, it is to be understood that these are capable of variation and modification, and we therefore do not wish to be limited to the precise details set forth, but desire to avail ourselves of such changes and alterations as fall within the purview of the following claims.

We claim:

1. Brake apparatus arranged within a single unitary housing and comprising a first cylinder having a brake applying piston mounted therein for reciprocal movement in a forward brake applying direction and in a return brake releasing direction, a second cylinder parallel to the first and having a piston containing wall and having a slack adjuster piston mounted therein for reciprocal movement in forward and return directions, a chamber interposed between said pistons for containing fluid to be placed under pressure to urge the brake applying piston in a brake applying direction, the forward face of said slack adjuster piston being in communication with said chamber to exert pressure on the fluid therein during forward movement of the slack adjuster piston, said second cylinder having a chamber therein behind the slack adjuster piston for receiving fluid under pressure causing movement of the slack adjuster piston in its forward direction, variantly spaceable means in the second cylinder inclusive of a stop for selectively limiting the extent of forward movement of said slack adjuster piston, a valve slidably carried by said slack adjuster piston and having a head normally engaged with the side of the slack adjuster piston that faces the chamber in the second cylinder in the closed position of the valve, whereby the pressure of fluid in the chamber behind the slack adjuster piston helps maintain the valve closed, said valve having a portion engageable with said stop, said valve having a ported stem connected to the head and slidable therewith between the open position of the valve enabling fluid to flow through the valve port from the chamber behind the slack adjuster piston to said interposed chamber and the closed position of the valve preventing such flow, a spring acting between the slack adjuster piston and said portion of the valve engageable with the stop normally to maintain the valve in a closed position, said slack adjuster piston being movable in a return direction by fluid under pressure in the first-named chamber consequent to the application of a return force to said brake applying piston, and means to admit fluid under pressure from a source into the chamber behind the slack adjuster piston causing forward movement thereof and consequent simultaneous forward movement of the brake applying piston until said stop is engaged and said valve opened as aforesaid whereupon further admission of fluid under pressure flows from said source to said interposed chamber causing independent forward movement thereof until the associated brake is engaged.

2. Apparatus according to claim 1 wherein the valve head in its closed position engages a static seal carried by the slack adjuster piston and wherein the periphery of the slack adjuster piston that slides relative to the containing wall of the second cylinder is provided with a dynamic seal.

References Cited in the file of this patent

UNITED STATES PATENTS

| | | |
|---|---|---|
| 697,140 | Goldschmidt | Apr. 8, 1902 |
| 2,240,792 | Liebreich | May 6, 1941 |
| 2,544,849 | Martin | Mar 13, 1951 |
| 2,588,955 | Brannen | Mar. 11, 1952 |

FOREIGN PATENTS

| | | |
|---|---|---|
| 711,336 | Great Britain | June 30, 1954 |